United States Patent [19]

Kyoto et al.

[11] Patent Number: 4,586,943
[45] Date of Patent: May 6, 1986

[54] METHOD FOR THE PRODUCTION OF GLASS PREFORM FOR OPTICAL FIBERS

[75] Inventors: Michihisa Kyoto; Naoki Yoshioka; Gotaro Tanaka; Minoru Watanabe; Hiroshi Shimba, all of Yokohama; Nobuo Inagaki, Katsuta, all of Japan

[73] Assignees: Sumitomo Electric Industries, Ltd., Osaka; Nippon Telegraph & Telephone Public Corporation, Tokyo, both of Japan

[21] Appl. No.: 661,451

[22] Filed: Oct. 16, 1984

[30] Foreign Application Priority Data

Oct. 20, 1983 [JP] Japan .................. 58-195209
Oct. 20, 1983 [JP] Japan .................. 58-195210

[51] Int. Cl.$^4$ ............... C03B 37/012; C03B 37/014
[52] U.S. Cl. .................. 65/3.12; 65/18.2; 65/DIG. 16
[58] Field of Search ........ 65/3.12, 3.11, 18.2, 65/2, DIG. 16

[56] References Cited

FOREIGN PATENT DOCUMENTS 2428618  2/1980  France .................. 65/3.12
55-67533  5/1980  Japan .................. 65/3.12
55-167149 12/1980 Japan .................. 65/18.2
56-50136  5/1981  Japan .................. 65/18.2
56-160333 12/1981 Japan .................. 65/3.12
57-135735 8/1982  Japan .................. 65/3.12

OTHER PUBLICATIONS

Derwent Abstract of Japan Pat. No. 57-170831, to Nippon; 10-21-82.

Primary Examiner—Kenneth M. Schor
Attorney, Agent, or Firm—Cushman, Darby & Cushman

[57] ABSTRACT

A method for producing a glass preform for optical fibers by heating a glass soot preform consisting of glass fine particles made mainly of silicon oxide, which method comprises the steps of:

(1) heating the glass soot preform to dehydrate and to remove impurities therefrom;
(2) heating the glass soot preform in a gas atmosphere containing at least fluorine or fluorine-based compound to add fluorine to the glass soot preform; and
(3) heating the glass soot preform to make it transparent, from the transparent preform prepared by which method, an optical fiber having superior transmission characteristics can be prepared.

15 Claims, 9 Drawing Figures

Treatment temperature (°C)

METHOD FOR THE PRODUCTION OF GLASS PREFORM FOR OPTICAL FIBERS

FIELD OF THE INVENTION

The present invention relates to a method for the production of a glass preform for optical fibers. More particularly, it is concerned with a method for producing a glass preform from which optical fibers having superior transmission characteristics are fabricated.

BACKGROUND OF THE INVENTION

A glass preform for use in the production of optical fibers comprises a core and a cladding surrounding it. It is required for the core to have a refractive index higher than that of the cladding for the purpose of transmission of light. For example, the glass preform has refractive index difference distribution patterns as shown in FIGS. 1A and 1B. In order to make the refractive index of the core A greater than that of the cladding B, usually, an additive such as $GeO_2$, $Al_2O_3$ and $TiO_2$ is added to silica glass to increase its refractive index.

The following problems, however, are encountered in adding such the additives:

(1) Increase of the amount of the additive causes light scattering (i.e. Rayleigh scattering). As the amount of the additive added increases, the degree of scattering increases. This is undesirable for light transmission.

(2) Addition of a larger amount of the additive will lead to the formation of bubbles and/or a crystal phase in the preform. $GeO_2$, for example, yields the bubbles due to generation of GeO gas. $Al_2O_3$ is liable to form clusters of $Al_2O_3$ crystals. The formation of the bubbles and the crystal phase is undesirable because they increases attenuation.

For these reasons, it is required to minimize the amount of the additive to be added to the core while maintaining the refractive index difference between the core and cladding as high as possible.

For this purpose, it has been proposed to add fluorine to silica glass to lower the refractive index of the preform. In accordance with this method, the additive such as $GeO_2$ is added to the core to increase the refractive index of the core, thereby achieving a predetermined refractive index difference between the core and the cladding and, thereafter, fluorine is added to lower the refractive index of the whole glass preform while maintaining the refractive index difference between the core and the cladding at the already achieved value, whereupon the apparent amount of the additive added to the core, as determined based on the refractive index of silica ($SiO_2$), is reduced. In this method, however, there are various problems to be overcome in connection with a procedure of adding fluorine.

Japanese Patent Publication No. 15682/1980, for example, discloses a procedure in which fluorine is added in the course of flame hydrolysis to form glass fine particles. This method has disadvantages such that an absolute amount of fluorine added is small and the required production time is long. This may be due to the fact that moisture contained in the flame reacts with fluorine gas according to, for example, the following reaction formula, thereby yielding HF gas:

$$SF_6 + 3H_2O \rightarrow SO_3 + 6HF \tag{1}$$

Since HF gas is stable, almost all of fluorine-based gases are converted into HF gas at a high temperature as long as there is moisture. Thus, only a small amount of fluorine-based gases left without being converted into HF gas are used as a raw additive.

Furthermore, HF erodes glass, particularly quartz and easily reacts with silica glass fine particles formed in the flame. This reaction may proceed according to the following reaction formulas (2) and (3). This reaction results in the consumption of the formed glass particles.

$$SiO_2(s) + 2HF(g) \rightarrow SiOF_2(g) + H_2O(g) \tag{2}$$

$$SiO_2(s) + 4HF(g) \rightarrow SiF_4(g) + 2H_2O(g) \tag{3}$$

wherein the symbols (s) and (g) represent solid and gas respectively.

Since the fluorine-based gas, therefore, acts to suppress accumulation of the silica glass fine particles, as the amount of the fluorine-based gas added increases, the rate of accumulation of silica glass fine particles decreases, and finally the silica glass particles are not accumulated at all.

Japanese Patent Application (OPI) No. 67533/1980 (the term "OPI" as used herein means a "published unexamined Japanese patent application") discloses a procedure in which a glass soot preform is formed and, thereafter, to the preform is added fluorine by sintering it in an atmosphere containing fluorine. Even in this method, the rate of addition of fluorine is low and, furthermore, the preform is sometimes contaminated with Cu and Fe. Another drawback is that in sintering at a temperature higher than 1400° C., the surface of the glass preform is vigorously etched producing a glass preform having an uneven surface. Still another drawback is that this etching allows easy invasion of impurities contained in a mandrel into the glass soot preform.

SUMMARY OF THE INVENTION

One object of the present invention is to overcome the above-described drawbacks of the conventional methods.

Another object of the present invention is to provide a method for the production of a glass preform from which optical fibers having superior transmission characteristics are fabricated.

Accordingly, the present invention provides a method for producing a glass preform for optical fibers by heating a glass soot preform consisting of glass fine particles made mainly of silicon oxide, which method comprises the steps of:

(1) heating the glass soot preform to dehydrate and to remove impurities therefrom;

(2) heating the glass soot preform in a gas atmosphere containing at least fluorine or fluorine-based compound to add fluorine to the glass soot preform; and (3) heating the glass soot preform to make it transparent. Preferably, the third heating step is carried out in a helium gas atmosphere or under reduced pressure.

DETAILED DESCRIPTION OF THE INVENTION

In the method of the present invention, a glass soot preform is prepared and, then, it is added with fluorine in a sintering step. The glass soot preform to be treated by the method of the invention is preferably in the form of a tube or a rod.

The method of the present invention is characterized in that the sintering step being performed in a specific manner.

Figure 1A:
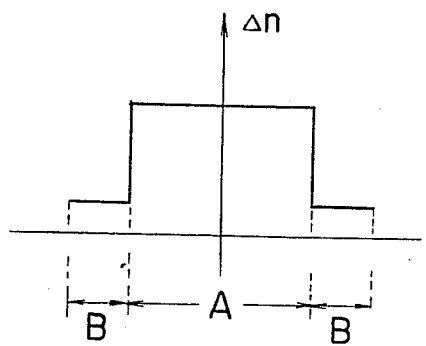
FIGS. 1A and 1B show refractive index distribution patterns of optical fibers.
Figure 2A:
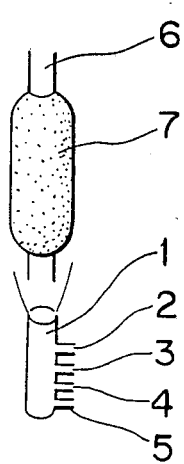
FIGS. 2A and 2B each schematically illustrates production of a glass soot preform.
Figure 1B:
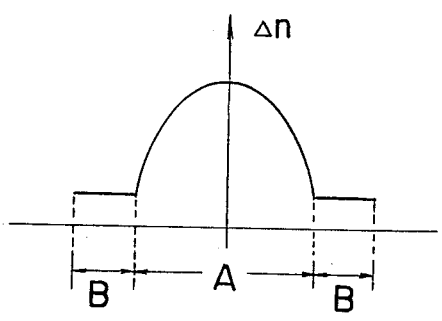
Figure 2B:
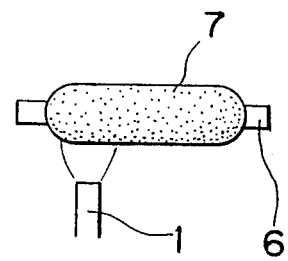
Figure 3:
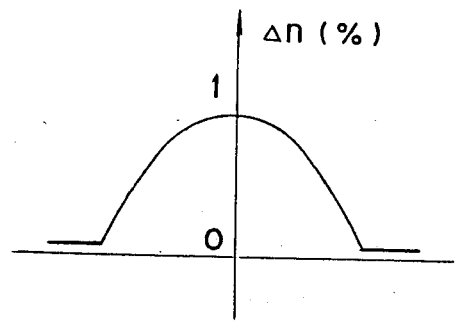
FIG. 3 shows a refractive index distribution pattern of a glass soot preform used in Example 1.

The glass soot preform, i.e. a mass of fine particles of silica glass may be prepared by various commonly used methods. Typical examples of such methods are the VAD method shown in FIG. 2A and the outside vapor phase oxidation (OVPO) method shown in FIG. 2B. In these two figures, the numeral 1 indicates a combustion burner; the numerals 2, 3, 4 and 5, inlets of gaseous starting materials; the numeral 6, a starting member; and the numeral 7, a mass of fine particles of silica glass. In the glass soot preform prepared by each method, the core is doped with, for example, $GeO_2$ so that the glass soot preform has a refractive index distribution pattern as shown in FIG. 3.

The glass soot preform is placed in a muffle tube made of pure quartz or of aluminium and then heated and sintered. This sintering process comprises three steps.

In the first heating step, the glass soot preform is dehydrated and impurities are removed therefrom. Preferably, the first heating step is carried out at a temperature of from 800° to 1200° C. If the temperature is lower than 800° C., the impurities cannot be removed and, further, a longer period of time is needed for dehydration. On the other hand, if the temperature is higher than 1,200° C., the glass soot preform tends to shrink and, thus, it becomes difficult to add fluorine to the glass soot preform in the subsequent second heating step. The heating time in the first step is usually from about 2 to 4 hours.

Heating is preferably carried out in a highly pure inert gas atmosphere. Even if it is carried out in an inert gas atmosphere containing chlorine-based gas, the dehydration and removal of impurities may be efficiently accomplished. As the chlorine-based gas, $Cl_2$, $SOCl_2$, $COCl_2$, $CCl_4$, and the like can be used.

In order to efficiently prevent the etching with fluorine gas, the concentration of the inert gas is preferably adjusted to not less than 80% by volume. Even if, however, the concentration of the inert gas is 0%, no serious problem will be encountered. The concentration of the chlorine-based gas is sufficient to be about 10% by volume.

Subsequent to the first heating step, the second heating step is carried out in order to add fluorine to the glass soot preform. Preferably, the second heat treatment is carried out at a temperature of from 1100° to 1400° C. The atmosphere is an inert gas atmosphere containing fluorine gas or a gaseous fluorine-based compound. As the fluorine-based compound, $CF_4$, $SF_6$, $SiF_4$, $COF_2$ and the like can be used.

Figure 4:
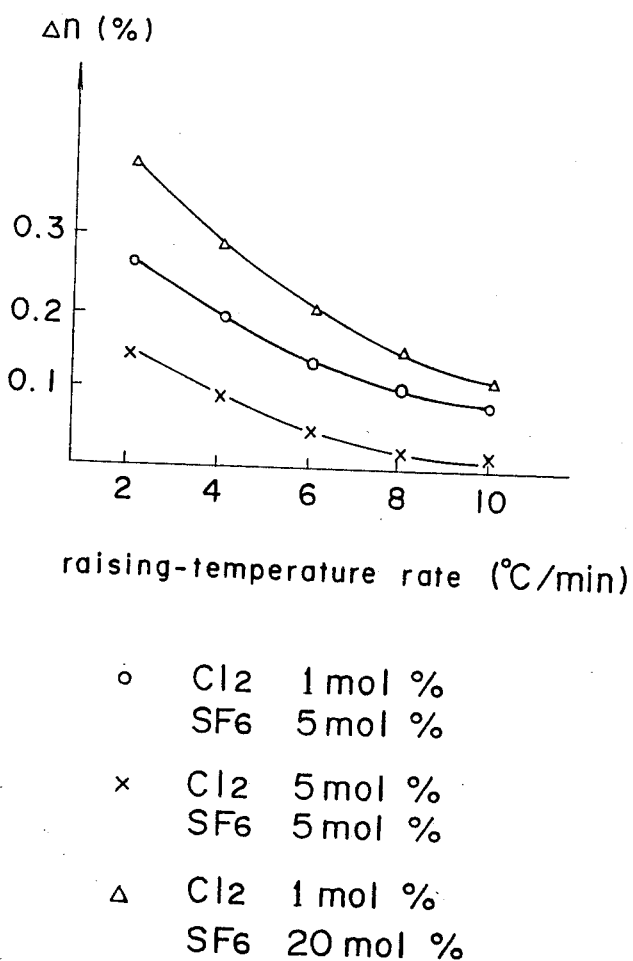
FIG. 4 is a graph showing relationships between temperature-raising rates and refractive index differences.

As the inert gas, $N_2$, Ar, He, and the like can be used. In the second heating step, preferably the temperature is raised at a rate of from 2° to 10° C./min. FIG. 4 shows the relationship between a temperature-raising rate and the refractive index difference corresponding to the amount of fluorine added to the glass soot preform. It can be seen from FIG. 4 that as the temperature-raising rate is lowered, the amount of fluorine added increases.

Figure 5:
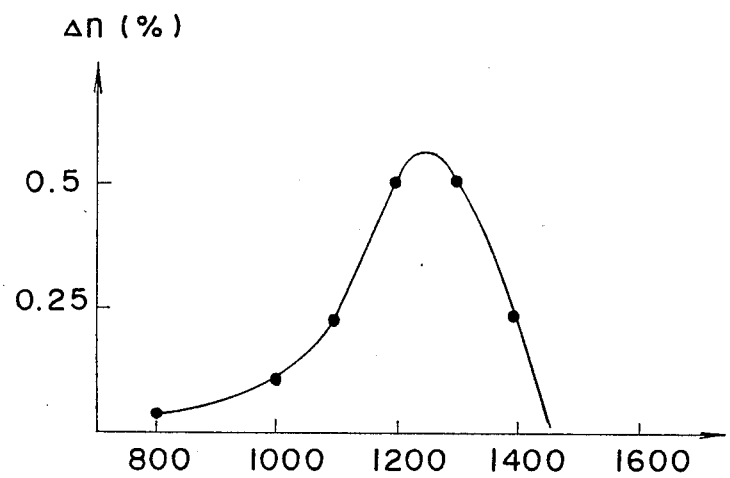
FIG. 5 is a graph showing a relationship between a treatment temperature and refractive index difference.

FIG. 5 shows the relationship between the treatment temperature in the atmosphere containing the gaseous fluorine-based compound and the refractive index difference $\Delta n$ corresponding to the amount of fluorine added. In this embodiment, the sintering atmosphere comprises helium gas containing 1 mol % of chlorine gas and 10 mol % of $SF_6$, and the refractive index difference $\Delta n$ is determined after the heat treatment is performed at each temperature shown for 3 hours. It can be seen from the graph of FIG. 5 that the refractive index difference $\Delta n$ is larger in a temperature range between 1100° and 1400° C. This demonstrates that this temperature range is suitable for the second heating step.

If the temperature is higher than 1400° C., the glass soot preform quickly shrinks so that fluorine cannot be efficiently added to the preform. The concentration of the fluorine-based compound is preferably not higher than 20 mol %. If the concentration of the fluorine-based gas is too high, the preform is etched with fluorine gas to some extent, but not so seriously as with HF.

Finally, the third heating step is carried out mainly for the purpose of converting the glass soot preform to a transparent one. Preferably, the third heating step is carried out at a temperature of not lower than 1400° C. for at least one hour. If the treatment temperature is lower than 1400° C., the fine glass particles are insufficiently sintered so that a certain proportion of the glass fine particles is left unsintered. More preferably the third heat treatment is carried out at a temperature in excess of 1600° C. In this case, the sintering process proceeds efficiently and the glass soot preform can be converted into a transparent one in a relatively short period of time. The third heating step is carried out in a helium gas atmosphere or under reduced pressure. In general, the sintering process for converting the glass soot preform into the transparent one is carried out in an atmosphere of argon gas or nitrogen gas. However, in case that the distribution of glass particle sizes is broad; that is, an irregularity in the particle size of the glass particles is large, if the sintering process is carried out in the usual atmosphere, bubbles are liable to remain during sintering and the glass soot preform shrinks, and consequently the glass soot preform cannot be made transparent desirably.

The ease of formation of the bubbles is in the following order: $N_2 > Ar >> He$. If, therefore, the sintering process is carried out in a helium gas atmosphere, a sintered preform containing the bubbles in a greatly reduced amount is produced, since the defoaming action in the helium gas atmosphere is greater than those in argon and nitrogen gas atmospheres. The defoaming can be accelerated also under reduced pressure.

Figure 6:
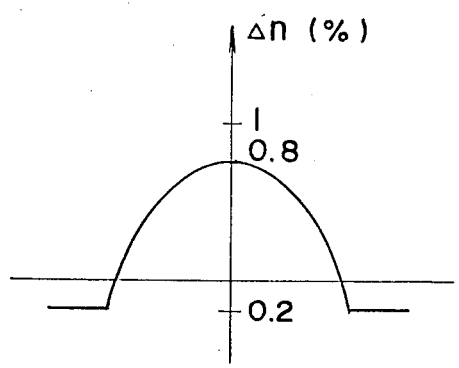
FIG. 6 shows a refractive index distribution pattern of a glass preform after the heat treatment in Example 1.
Figure 7:
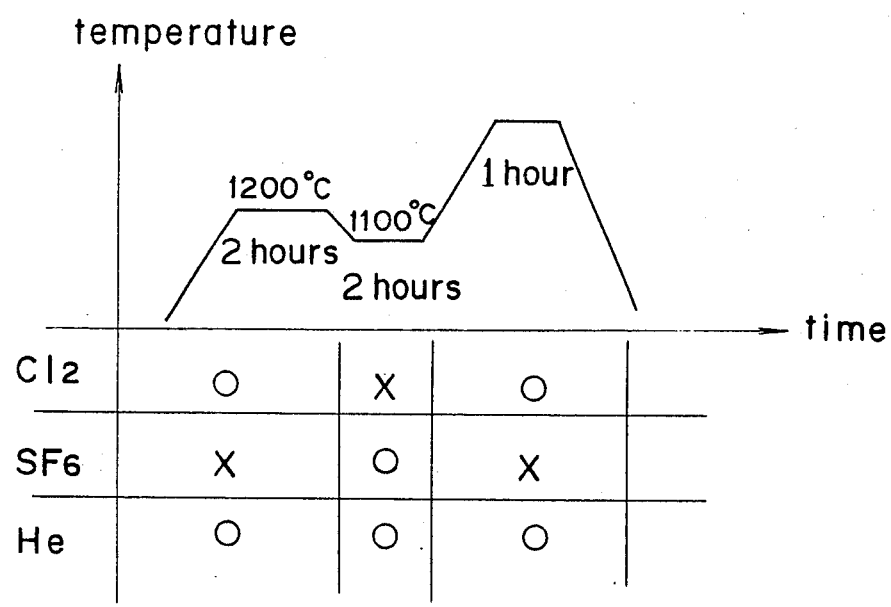
FIG. 7 is a schematic diagram showing an embodiment of the heat treatment of the present invention.

An embodiment of the heating mode of the present invention is shown schematically in FIG. 7. An example of the refractive index distribution of a glass preform produced in this embodiment is shown in FIG. 6. By comparing FIG. 3 with FIG. 6, it can be seen that the refractive index of the whole preform is decreased by about 0.2% while maintaining a refractive index difference Δn of about 1.0% between the center of the core and the cladding.

Preferably, a bulk density of the core is made larger than that of the cladding.

In the present invention, as described above, the dehydration of the glass soot preform and the removal of impurities are effected in the first heating step. Thus, the optical fibers fabricated from the glass soot preform prepared by the method of the invention are greatly reduced in attenuation resulting from impurities. That is, the dehydration of the glass soot preform enables to suppress the formation of HF during the addition of fluorine to the preform. HF, if present in a large amount, erodes the muffle tube and makes impurities contained in the muffle tube walls exposed. Such the exposed impurities contaminate the glass soot preform. Since, however, the impurities are removed from the system in the first heating step, such contamination of the soot preform with the impurities can be prevented. For example, even if CuO is present in the atmosphere, it is converted into $Cu_2O$ at an elevated temperature of higher than 800° C. according to the following reaction formula, and is removed as $Cu_2O$ gas from the system.

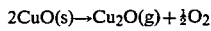

$$2CuO(s) \rightarrow Cu_2O(g) + \tfrac{1}{2}O_2$$

In this reaction, as the temperature is raised, the formation of $Cu_2O$ gas is accelerated. At a temperature of higher than 1000° C., the CuO impurity is much efficiently removed. Furthermore, when chlorine gas is added, CuO is converted into $CuCl_2$ according to the following reaction formula and thus can be easily removed from the system.

$$CuO(s) + Cl_2 \rightarrow CuCl_2(g) + \tfrac{1}{2}O_2\,(g)$$

This is applicable to $Fe_2O_3$.

Since the formation of HF is suppressed by dehydration of the soot preform, the etching of the glass preform is prevented and thus there can be obtained a glass preform having a smooth surface. In addition, erosion of, for example, the muffle tube can be prevented.

The present invention will be hereinafter explained in greater detail by the following Examples.

EXAMPLE 1

A glass soot preform having a refractive index distribution pattern as shown in FIG. 3 was placed in a furnace, pure He gas was introduced into the furnace at a rate of 10 l/min, and the soot preform was heated at 600° C. for 3 hours. Then, the temperature was raised to 1100° C. in 10 minutes. At the same temperature, $SF_6$ was supplied to the He gas at a rate of 100 ml/min. while raising the temperature to 1400° C. at a rate of 3.3° C./min. After keeping the temperature at 1400° C. for 1 hour, He gas was introduced into the furnace at a rate of 10 l/min, and the temperature in the furnace was raised to 1650° C. to convert the glass soot preform into a transparent one. The thus-obtained transparent preform had a refractive index distribution pattern as shown in FIG. 6, and the attenuation of 1.2 dB/km at 1.30 micrometers, and the OH content was 0.01 ppm.

The same procedure as above was repeated with the exception that the heating temperature in the first step was 800° C. The attenuation resulting from impurities was 0.8 dB/km at 1.30 micrometers.

Again, the same procedure as above was repeated with the exception that the heating temperature at the first step was 1100° C. The attenuation resulting from impurities was 0.6 dB/km at 1.30 micrometers.

EXAMPLE 2

The procedure of Example 1 was repeated with the exception that, in the first heating step, 0.5 to 5 mol % of $Cl_2$ was supplied to the pure He gas atmosphere. In case of adjusting the heating temperature in the first heating step to 1100° C., even if the glass soot preform was kept at that temperature only for about 10 minutes, the resulting optical fiber did not contain any traces of impurities. This was confirmed by the attenuation characteristics of the optical fiber.

When 0.5 to 5 mol % of $Cl_2$ gas was added to the $SF_6$-containing atmosphere in the present example, any trances of impurities could be found in the resulting optical fiber.

EXAMPLE 3

A glass soot preform having a bulk density of the core of 0.4 g/cm³ and that of the cladding of 0.2 g/cm³ was prepared. It was heated to a temperature of from 800° to 1200° C. in a He gas atmosphere containing 0.5 to 5 mol % of $Cl_2$ and kept at 1200° C. for 1 hour. Then, 2 to 5 mol % of fluorine gas was further added, and the temperature was raised to 1400° C. The thus-obtained preform was inserted downwardly in a zone-heating furnace at a rate of 3 to 4 mm/min, said furnace being arranged so that the maximum temperature was 1650° C. and being in a He gas atmosphere under reduced pressure, whereupon the preform was converted into a transparent one. In the preform, the core had substantially the same retractive index as that of pure silica, and the cladding has the same refractive index as obtained by the addition of fluorine. An optical fiber fabricated from the preform had the attenuation of 0.4 dB/km at 1.30 micrometers.

EXAMPLE 4

On a pure $SiO_2$ rod having an outer diameter of 5 mm which had been sufficiently dehydrated was deposited pure $SiO_2$ soot through flame hydrolysis of $SiCl_4$ according to the VAD process. The outer diameter after the deposition was adjusted to about 100 mm. This preform was subjected to a dehydration treatment at 1100° C. for 3 hours. As the atmosphere, a He atmosphere containing 1 mol % of $Cl_2$ was used. Then the flow of $Cl_2$ was stopped; that is, the proportion of $Cl_2$ was O and $SF_6$ was flown at proportion of 5 mol %. The temperature was raised to 1400° C. at a temperature-raising speed of 3.3° C./min. Thereafter, the preform was converted into a transparent glass body by heating up to 1500° C. while feeding He gas. In the thus-produced glass preform, the diameter of the core was 10 times that of the cladding, and the refractive index of the cladding was 0.4% lower than that of quartz. This preform was drawn so that the outer diameter was 20 mm and inserted through a quartz glass tube (outer diameter: 32.5 mm; inner diameter: 22 mm), which was then drawn to produce a fiber having an outer diameter of 125 μm. In the thus-obtained fiber, the transmission loss at a wavelength of 1.3 μm was 1 dB/km. The peak at a wavelength of 1.39 μm was less than 5 dB/km.

What is claimed is:

1. A method for producing a glass preform for optical fibers by heating a glass soot preform consisting of fine glass particles made substantially of silicon dioxide, wherein the formation of hydrogen fluoride by fluorine or fluorine-based treating compounds during heating is suppressed, which method comprises the steps of:
(1) heating the glass soot preform to from 800° to 1,200° C., until it is dehydrated and any volatile impurities are removed;
(2) then heating the glass soot preform at a temperature which is at most 1400° C. in a gas atmosphere containing at least fluorine or fluorine-based compound in the absence of hydrogen containing compounds to add fluorine to the glass soot preform; and
(3) then after all the fluorine has been added, heating the glass soot preform to sinter said preform into a transparent glass preform.

2. A method as claimed in claim 1, wherein the temperature in the first heating step is from 800° to 1200° C.

3. A method as claimed in claim 1, wherein the temperature in the second heating step is from 1100° to 1400° C.

4. A method as claimed in claim 1, wherein the temperature in the third heating step is not lower than 1600° C.

5. A method as claimed in claim 1, wherein the glass soot preform is in the form of a tube or a rod.

6. A method as claimed in claim 1, wherein the third heating step is carried out in a helium gas atmosphere.

7. A method as claimed in claim 1, wherein the fluorine-based compound to be used in the second heating step is selected from the group consisting of $CF_4$, $SF_6$, $SiF_4$ and $COF_2$.

8. A method as claimed in claim 1, wherein the glass soot preform comprises a core and a cladding and a bulk density of the core is larger than that of the cladding.

9. A method as claimed in claim 8, wherein the temperature in the first heating step is from 800° to 1200° C.

10. A method as claimed in claim 8, wherein the temperature in the second heating step is from 1100° to 1400° C.

11. A method as claimed in claim 8, wherein the temperature in the third heating step is not lower than 1600° C.

12. A method as claimed in claim 8, wherein the glass soot preform is in the form of a tube or a rod.

13. A method as claimed in claim 8, wherein the third heating step is carried out in a helium gas atmosphere.

14. A method as claimed in claim 8, wherein the fluorine-based compound to be used in the second heating step is selected from the group consisting of $CF_4$, $SF_6$, $SiF_4$ and $COF_2$.

15. A method as in claim 1, wherein the temperature in the second heating step is from 1100° to 1400° C., and the temperature in the third heating step is not lower than 1600°.

* * * * *